Dec. 20, 1932.                M. E. HENNING                 1,891,537
                        AUTOMATIC CONTROL SWITCH
                          Filed July 29, 1932
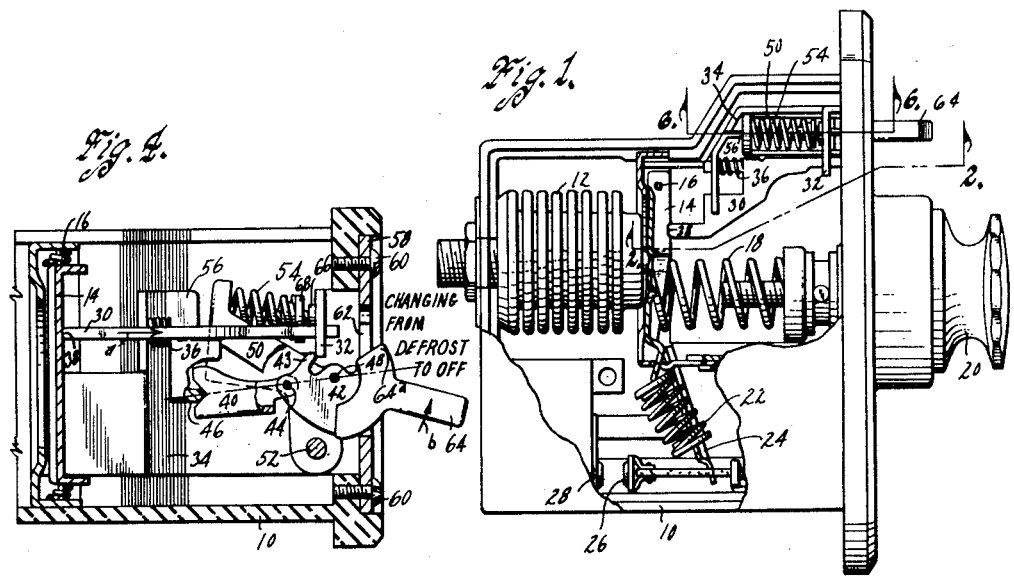
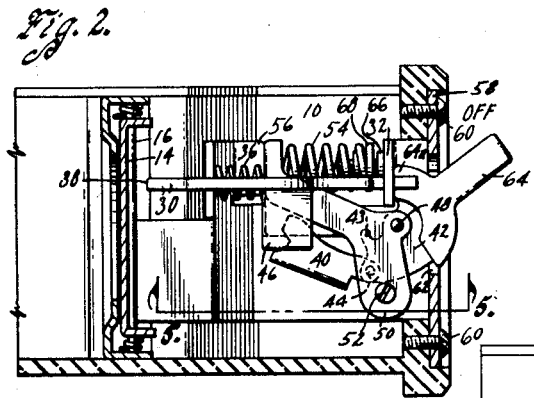
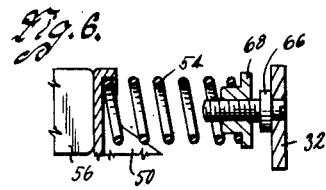
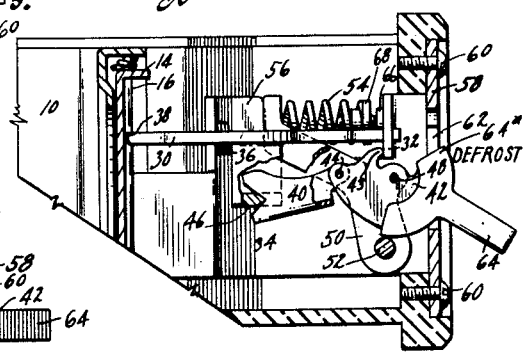
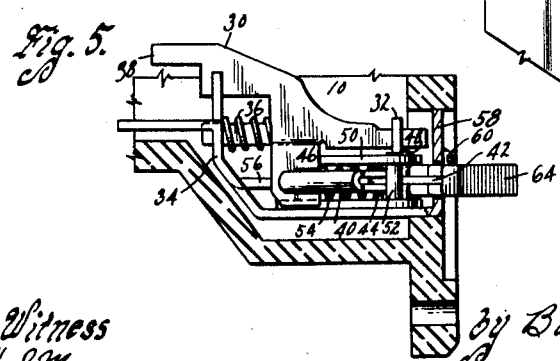

Patented Dec. 20, 1932

1,891,537

UNITED STATES PATENT OFFICE

MALCOLM E. HENNING, OF DES MOINES, IOWA, ASSIGNOR TO PENN ELECTRIC SWITCH CO., OF DES MOINES, IOWA, A CORPORATION OF IOWA

AUTOMATIC CONTROL SWITCH

Application filed July 29, 1932. Serial No. 625,780.

The object of my invention is to provide an automatic control switch which is simple, durable and comparatively inexpensive to manufacture.

A further object is to provide for use with an automatic controlling device, means for prolonging one of the cycles thereof so that when the controlling device, for instance, is used for automatically controlling an electrically operated refrigerator, the device can be set for prolonging one of the de-energized cycles to permit the temperature of the refrigerator to rise and defrost the cooling unit thereof, the controlling device involving a spring loading feature which can be adjusted for predetermining the prolongation of the de-energized cycle.

A further object is to provide a means for modifying one of the cycles of operation of a device, such means comprising a control mechanism and means for spring loading it in one direction until a predetermined movement has occurred, whereupon the device is automatically unloaded and permits the control mechanism to re-continue its normal automatic operation.

Still a further object is to provide an actuating member to be engaged by a movable member of an automatic cyclically operated control mechanism with toggle levers and spring loading means whereby the actuating member may be manually operated to an effective position and automatically operated to an ineffective position by movement of the movable member.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation of a control mechanism embodying my invention, part of the near side cover for the casing being broken away.

Figure 2 is a sectional view on the line 2—2 of Figure 1 showing the mechanism embodying my invention in the off position.

Figure 3 is a similar view showing the parts in defrosting position.

Figure 4 is a similar view showing the parts being automatically moved from defrosting to off position.

Figure 5 is a sectional view on the line 5—5 of Figure 2; and

Figure 6 is an enlarged sectional view on the line 6—6 of Figure 1.

On the accompanying drawing, I have used the reference numeral 10 to indicate generally a casing. Within the casing 10, a pressure bellows 12 is mounted which may be connected with a pressure bulb to be inserted in the cooling compartment of a refrigerator. The bellows 12 operates a swinging lever 14 pivoted on a pin 16 against the action of a spring 18. The spring 18 is adjusted by a knob 20.

The swinging lever 14 through an over-center spring 22 operates an arm 24 which in turn slides a movable contact 26 into and out of engagement with a stationary contact 28. The parts thus far described have to do with an automatically operated switch for controlling the operation of the electric motor of a refrigerating system. It is to a control device of this character that I apply my invention, which in the present instance is shown as a defroster. My present invention includes an actuating member 30 slidably mounted in perforated brackets 32 and 34.

The actuating member 30 is normally spaced from the arm 14 or rather the web of the arm (which is channel-shaped as shown in Figure 2) by a spring 36. The actuating member 30 has an end 38 adapted to be spaced from or engaged with the arm 14.

The spring 36 tends to force the actuating member 30 in one direction and its movement in such direction is limited by toggle levers 40 and 42. The toggle levers are pivoted together at 44 while one of them pivotally engages an extension 46 of the actuating member 30 and the other one is pivoted to a pin 48. The pin 48 is carried by a lever 50 which is pivoted at 52.

The lever 50 and thereby the pivot 48 is spring loaded by a spring 54. An ear 56 limits the movement of the lever 50 as caused by the spring 54. The ear 56 and the brackets 32 and 34 are actually part of a single bracket member which has a head plate 58 mounted on the casing 10 by screws 60.

The head plate 58 is provided with a slot 62 through which a handle 64 of the toggle lever 42 extends. The spring 54 is adjustable, a rotatable and non-slidable screw 66 and a non-rotatable collar 68 threaded thereon being provided for this purpose.

*Practical operation*

Referring to Figure 2, it will be noted that a shoulder 64a of the handle 64 engages the bracket 32. This limits swinging movement of the toggle lever 42 and consequently the toggle lever 40.

Swinging of the lever 50 is prevented by the stop ear 56. The end 38 of the actuating member 30, it will be noted, is spaced from the movable member or arm 14. In this position, the control switch will operate automatically without being affected by the defroster mechanism.

When it is desired to defrost the refrigerator, the handle 64 is thrown to the position of Figure 3 which extends the toggle lever 40 and moves the end 38 of the actuating member 30 to position adjacent the movable member 14 so that during its movement it can engage the actuating member 30 and move it in the direction of the arrow a in Figure 4.

As the temperature rises and the bellows 12 expands, the actuating member 30 will be moved in the direction of the arrow a which will tend to swing the handle 64 further toward the defrost position. A stop lug 43 on the toggle lever 42, however, is in engagement with the bracket 32 which will result in a tendency to rotate the handle 64 in the direction of the arrow b and move the pivot pin 48 toward the right, thus swinging the lever 50 against the tension of the spring 54. Thus the spring 54 opposes the movement of the arm 14 so that additional pressure in the bellows 12 must be produced to move the lever 14 until the switch contacts 26 and 28 are closed.

Just after the parts assume the position of Figure 4 wherein the pivot ear 46 and the pivot pins 44 and 48 are all in alinement with each other, these parts will pass overcenter beyond alinement and allow the springs 36 and 54 to expand and return the parts to the initial position of Figure 2. The switch contacts will then be engaged, but in the meantime a higher degree of temperature has been produced in the refrigerator for melting the frost from the cooling unit and of course an additional time interval has been added to the particular cycle of the control device just described. With the parts again in the position of Figure 2 it will be obvious that there will be no repetitions of the defrosting operation except when the device is manually reset from the off position of Figure 2 to the defrost position of Figure 3.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. For use with a control mechanism including a cyclically operated movable member, means for temporarily modifying the operation of a device controlled by said control mechanism comprising an actuating member to be moved by said movable member, a spring loaded toggle pin, a pair of toggle levers interposed between said pin and said actuating member and means engaging one of said toggle levers to impart pivotal movement thereto past alined position when said toggle pin is moved against the action of the spring loading it.

2. For use with a control mechanism including a cyclically operated movable member, means for temporarily modifying the operation of a device controlled by said control mechanism comprising an actuating member to be moved by said movable member, a spring loaded toggle pin, a pair of toggle levers interposed between said pin and said actuating member, overcenter resilient means constraining said toggle levers to assume either one of two positions and means engaging one of said toggle levers to impart pivotal movement thereto and move it from one of said positions to the other one when said toggle pin is moved against the action of the spring loading it.

3. For use with a control mechanism including a cyclically operated movable member, means for temporarily modifying the operation of a device controlled by said control mechanism comprising an actuating member to be moved by said movable member but normally spaced therefrom, a spring loaded toggle pin, a pair of toggle levers interposed between said pin and said actuating member, one of said toggle levers being manually engageable for moving it to a position for said actuating member to be engaged by said movable member and means engaging one of said toggle levers to impart pivotal movement thereto past alined position when the toggle pin is moved against the action of the spring loading it.

4. For use with a control mechanism including a cyclically operated movable member, means to temporarily modify the operation of a device controlled by said control mechanism comprising an actuating member normally spaced from said movable member, means to move said actuating member to a position to be engaged by said movable member whereby said movable member may move said actuating member during a portion of a cycle of the movement thereof and a spring opposing such movement of said means, said means being automatically adjustable to a position for discontinuing the opposition of said spring after a predetermined movement of said movable and said actuating members.

5. For use with a control mechanism including a cyclically operated movable member, means to temporarily modify the operation of a device controlled by said control mechanism comprising an actuating member normally spaced from said movable member, toggle lever means to move said actuating member to a position to be engaged by said movable member whereby said movable member may move said actuating member during a portion of a cycle of the movement thereof and a spring opposing such movement of said toggle lever means, said toggle lever means being automatically adjustable to a position for discontinuing the opposition of said spring after a predetermined movement of said movable and actuating members.

6. For use with a control mechanism including a cyclically operated movable member, means to temporarily modify the operation of a device controlled by said control mechanism comprising an actuating member normally spaced from said movable member, toggle lever means to move said actuating member to a position to be engaged by said movable member whereby said movable member may move said actuating member during a portion of a cycle of the movement thereof and a spring opposing such movement of said toggle lever means, said toggle lever means being movable by continued movement of said movable and actuating members to overcenter position for rendering said spring inoperative to cause such opposition.

7. For use with an automatic control device having an alternately oppositely movable member, means to prolong the movement of said member in one direction comprising a pair of settable spring loaded toggle levers to be engaged by said movable member, said movable member when engaging said toggle levers and moving them against the action of the spring loading them serving to cause the toggle levers to break overcenter and render the spring loading ineffective to cause further prolongation of the movement of the movable member until the toggle levers are reset.

8. For use with an automatic control device having an alternately oppositely movable member, means to prolong the movement of said member in one direction comprising a pair of settable spring loaded toggle levers to be engaged by said movable member, said movable member when engaging said toggle levers, moving them against the action of the spring loading them and means engaged by one of said toggle levers to impart pivotal movement thereto to cause said lever to break overcenter during movement of the movable member to render said loading ineffective to cause further prolongation of movement of the movable member until the toggle levers are reset.

9. For use with an automatic control device having an alternately oppositely movable member, means to prolong the movement of said member in one direction comprising a pair of spring loaded toggle levers to be engaged by said movable member, said movable member when engaging said toggle levers and moving them against the action of the spring loading them serving to cause the toggle levers to break overcenter and render the spring loading ineffective to cause further prolongation of the movement of the movable member.

10. Mechanism for modifying the operation of an automatically movable member comprising an actuating member for engagement therewith but normally spaced therefrom, a spring to constrain said actuating member toward a position spaced therefrom and toggle levers to limit such spacing, said toggle levers being movable to move said actuating member from initial position to a position to be engaged by said movable member, said toggle levers being spring loaded.

11. Mechanism for modifying the operation of an automatically movable member comprising an actuating member for engagement therewith but normally spaced therefrom, a spring to constrain said actuating member toward a position spaced therefrom and toggle levers to limit such spacing, said toggle levers being movable to move said actuating member from initial position to a position to be engaged by said movable member, said toggle levers being spring loaded and operable to initial position by the movable member as it moves.

12. Mechanism for modifying the operation of an automatically movable member comprising an actuating member for engagement therewith but normally spaced therefrom, a spring to constrain said actuating member toward a position spaced therefrom and toggle levers to limit such spacing, said toggle levers being manually movable to move said actuating member from initial position to a position for engagement by said movable member, said toggle levers being spring loaded.

13. Mechanism for modifying the operation of an automatically movable member comprising an actuating member for engagement therewith but normally spaced therefrom, a spring to constrain said actuating member toward a position spaced therefrom, toggle levers to limit such spacing, said toggle levers being manually movable to move said actuating member from initial position to a position for engagement by said movable member, said toggle levers being spring loader and means actuated by said movable member to return said toggle levers to initial position.

14. Mechanism for modifying the operation of an automatically movable member comprising an actuating member for engagement therewith but normally spaced therefrom, a spring to constrain said actuating member toward a position spaced therefrom, toggle levers to limit such spacing, said toggle levers being manually movable to move said actuating member from initial position to a position for engagement by said movable member, said toggle levers being spring loaded and means engageable by said toggle levers during movement thereof by said movable member to impart pivotal movement to the toggle levers and thereby return them to initial position.

15. Mechanism for modifying the operation of an automatically movable member comprising an actuating member for engagement therewith but normally spaced therefrom, means constraining said actuating member toward a position spaced therefrom, toggle levers to limit such spacing, said toggle levers being movable to move said actuating member from initial position to a position to be engaged by said movable member, a pivot for said toggle levers and a spring loading said pivot, said toggle levers being operable to initial position by movement of said movable member whereby to discontinue the loading of said pivot.

MALCOLM E. HENNING.